(12) United States Patent
Leo et al.

(10) Patent No.: US 6,430,550 B1
(45) Date of Patent: Aug. 6, 2002

(54) PARALLEL DISTINCT AGGREGATES

(75) Inventors: John Leo, Palo Alto; Cetin Ozbutun, San Carlos; William H. Waddington, Foster City; Shivani Gupta, Mountain View, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/455,004

(22) Filed: Dec. 3, 1999

(51) Int. Cl.$^7$ ............................................... G06F 17/30
(52) U.S. Cl. .................... 707/2; 707/3; 707/10
(58) Field of Search ................. 707/100, 101, 707/102, 1–10

(56) References Cited

U.S. PATENT DOCUMENTS

| | | | | |
|---|---|---|---|---|
| 5,511,190 A | * | 4/1996 | Sharma et al. .................. | 707/1 |
| 5,598,559 A | * | 1/1997 | Chaudhuri ....................... | 707/2 |
| 5,819,255 A | * | 10/1998 | Celis et al. ...................... | 707/2 |
| 5,857,180 A | * | 1/1999 | Hallmark et al. ............... | 707/2 |
| 5,884,299 A | * | 3/1999 | Ramesh et al. ................. | 707/10 |
| 5,918,256 A | * | 6/1999 | Delaney ......................... | 60/276 |
| 6,088,524 A | * | 7/2000 | Levy et al. ...................... | 707/3 |
| 6,112,198 A | * | 8/2000 | Lohman et al. ................. | 707/3 |
| 6,199,063 B1 | * | 3/2001 | Colby et al. .................... | 707/102 |
| 6,339,770 B1 | * | 1/2002 | Leung et al. ................... | 707/102 |

* cited by examiner

Primary Examiner—Jack Choules
Assistant Examiner—Debbie M Le
(74) Attorney, Agent, or Firm—Hickman Palermo Truong & Becker LLP; Brian D. Hickman; Cheryl A. Eichstaedt

(57) ABSTRACT

Techniques are provided for executing distinct aggregation operations in a manner that is more scalable and efficient than prior techniques. A three-stage technique is provided to parallelize aggregation operations that involve both grouping and multiple distinct-key columns. Such queries are handled by splitting rows into as many pieces as there are distinct aggregates in the query, and processing the row pieces. During the first-stage, a set of slave processes scans the rows of the base tables and performs partial duplicate elimination. During the second-stage, a set of slave processes completes the duplicate elimination and performs partial set function aggregation. During the third-stage, a third set of slave processes completes the set aggregation to produce the results of the distinct aggregation operation. In addition, two-stage parallelization techniques are provided for parallelizing single-distinct aggregations, and for parallelizing distinct aggregation operations that involve multiple distinct-key columns, but do not require grouping.

38 Claims, 5 Drawing Sheets

FIG. 1

| REGION | EMPNO | MGR | AGE |
|--------|-------|-----|-----|
| N | 1 | X | 21 |
| S | 2 | Y | 20 |
| E | 3 | Z | 33 |
| N | 50 | X | 35 |
| S | 100 | X | 21 |
| W | 4 | A | 40 |
| N | 36 | A | 41 |
| S | 40 | Y | 20 |

110, 112, 114, 116, 118, 120, 122, 124

PARALLEL DISTINCT AGGREGATES

FIELD OF THE INVENTION

The present invention relates to aggregation operations and, more particularly, to parallelizing distinct aggregation operations.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

In typical database systems, users write, update and retrieve information by submitting commands to a database application. To be correctly processed, the commands must comply with the database language that is supported by the database application. One popular database language is known as Structured Query Language (SQL).

Multi-processing systems are typically partitioned into nodes, where each node may contain multiple processors executing multiple concurrent processes. To fully utilize the computing power of a multi-processing system, a database application may divide a large processing task required by a query into smaller work granules which may then distributed to processes running on one or more processing nodes. Because the various work granules are being performed in parallel, the processing required by the query can be completed much faster than if the processing were performed on a single node by a single process. One mechanism for implementing parallel operations in a database management system is described in U.S. patent application Ser. No. 08/441,527 entitled "Method and Apparatus for Implementing Parallel Operations in a Database Management System" filed on May 15, 1995, by Gary Hallmark and Daniel Leary, incorporated herein by reference.

Unfortunately, not all types of operations can be efficiently performed in parallel. For example, distinct aggregation operations pose parallelization difficulties. A distinct aggregation operation is an operation in which some form of aggregation (e.g. SUM, COUNT, or AVERAGE) is performed on the results of a DISTINCT operation. A DISTINCT operation causes the elimination of duplicate values in specified sets of data. For example, the SQL query "select distinct deptno from emp" returns the set of unique departments "deptno" from the table "emp." Even if a particular department number appears in fifty rows of the table "emp", it will only appear once in the result set of the query.

The parallelization difficulties posed by distinct aggregation operations may be illustrated with reference to the following query (Q1), where emp identifies table 100 shown in FIG. 1, which has columns "region", "empno", "age" and "mgr":

select count (distinct mgr)
from emp
group by region

In this query, the column "region" is referred to as the "group by" column because it contains the values that are used as the basis for forming the rows into groups. Thus, all rows with the same "region" value belong to the same group. On the other hand, the column "mgr" is referred to as the "distinct-key" column because it is the column that holds the values that are involved in the duplicate elimination. Thus, within each region group, rows are eliminated if their "mgr" value duplicates the "mgr" value of another row in the group.

Query Q1 returns the number of distinct managers there are in each region. During execution of this query, the database server (1) groups together rows by region value, (2) eliminates, within each region group, rows that have duplicate manager values, and (3) counts how many rows remain in each region group after the duplicates have been removed. In table 100 illustrated in FIG. 1, this operation results in the values: 2 for region N, 2 for region S, 1 for region E, and 1 for region W.

For accurate results, the duplicate elimination is performed after the group by function and before the aggregate operation. The duplicate elimination is performed after the group by function because the duplicate elimination requires the elimination of only those values that are duplicated within the same group. That is, a value is only a "duplicate" if it matches another value within the same group, regardless of whether the value matches values in other groups. Therefore, all duplicates cannot be identified until all rows that belong to a group have been grouped together.

The duplicate elimination is performed before the aggregate function because the aggregate function requires the aggregation of only those rows associated with nonduplicate distinct-key-column values. For example, if Q1 is executed without performing the distinct operation before the count operation, the results of the count operation would be: 3 for region N, 3 for region S, 1 for region E, and 1 for region W. Once the count operation has produced these results, it is not possible to perform duplicate elimination on those results to produce the correct results.

Parallelizing operations generally involves distributing tasks among slave processes. The set of all processes responsible for performing a particular stage of an operation is referred to as a "row source". When an operation involves multiple tasks, the operation is often performed in stages using multiple row sources, where the results produced by one row source are provided as input to a subsequent row source.

Using conventional techniques, distinct aggregation operations are parallelized by dividing the operation into two stages and using two row sources. During the first-stage of the operation, the tables identified in the query are scanned by a first row source (a first set of slave processes). Each slave process in the first row source is assigned to scan a different table or portion of table. In Q1, only one table "emp" is referenced, so each slave process in the first row source may be assigned to scan a different portion of the "emp" table.

At the second-stage, a second row source receives and processes the rows produced by the first row source. Each slave process in the second row source corresponds to a group (or set of groups) formed by the "group by" statement. For example, the "group by" statement of Q1 groups by region. There are four distinct region values stored in table emp (N, S, E, W). Therefore, the second row source used to execute Q1 may include up to four slave processes (i.e. one slave process for each distinct region value).

After reading a row, each process in the first row source determines the group to which the row belongs, and sends the row to the slave process in the second row source that corresponds to that group. Consequently, each slave process in the second row source will receive the rows for the group assigned to it, regardless of which of the first row sources retrieved the rows. Thus, for example, the slave process in the second row source that is associated with region "N" receives rows 110, 116 and 122. Each slave process in the second row source eliminates duplicates from the rows it receives, and then counts how many non-duplicate rows remain in each group.

Unfortunately, this technique for parallelizing distinct aggregation operations has severe limitations. For example, the maximum degree of parallelism available during the second-stage of the process is limited to the number of groups formed by the "group by" statement. The number of groups thus formed may be significantly less than the number of processors available to participate in the operation. For example, in a system that includes 64 processors, 60 processors may remain idle while the remaining 4 are busy for an extended period of time while executing the four slave processes in the second row source.

Further, the fact that the degree of parallelism for the second row source is so limited has a substantial effect on the overall efficiency of the query processing because the bulk of the processing is performed by the second row source. As illustrated in the example given above, each process in the first row source (whose degree of parallelism is not limited) is merely responsible for reading rows and transmitting them to the appropriate slave process in the second row source. On the other hand, each process in the second row source is responsible for removing duplicates and executing the aggregation operation.

Based on the foregoing, it is clearly desirable to provide a mechanism and technique for executing distinct aggregate operations in parallel in a manner that is more scalable and efficient than current techniques.

SUMMARY OF THE INVENTION

Techniques are provided for executing distinct aggregation operations in a manner that is more scalable and efficient than prior techniques. For distinct aggregate operations that involve a single distinct-key column, a two stage parallelization technique is provided in which much of the processing responsibility is pushed down to the first-stage row source, whose degree of parallelism is not limited by the group-by values. Specifically, the processes in the first-stage row source form the rows they scan into groups, and eliminate duplicates from those groups. The groups are then passed to a second-stage row source where the duplicate elimination is completed, and the set aggregation is performed.

According to another aspect of the invention, a technique is provided for parallelizing distinct aggregation operations that involve multiple distinct-key columns, but do not require grouping. Much of the processing responsibility is pushed down to the first-stage row source, whose degree of parallelism is not limited by number of distinct values. Specifically, the processes in the first-stage row source split the rows they scan into "row pieces", where each piece created from a row is associated with a different distinct-key column. The first-stage row source groups the row pieces based on the distinct-key column with which they are associated, and eliminates duplicates from those groups. The groups are then passed to a second-stage row source where the duplicate elimination is completed, and the set aggregation is performed.

According to another aspect of the invention, a three-stage technique is provided to parallelize aggregation operations that involve both grouping and multiple distinct-key columns. According to one embodiment, such queries are handled by splitting rows into as many pieces as there are distinct aggregates in the query, and processing the row pieces. During the first-stage, a set of slave processes scans the rows of the base tables and performs partial duplicate elimination. During the second-stage, a set of slave processes completes the duplicate elimination and performs partial set function aggregation. During the third-stage, a third set of slave processes completes the set aggregation to produce the results of the distinct aggregation operation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of a table used in examples given herein;

DETAILED DESCRIPTION OF THE PREFERRED EMBODIMENT

Figure 2:
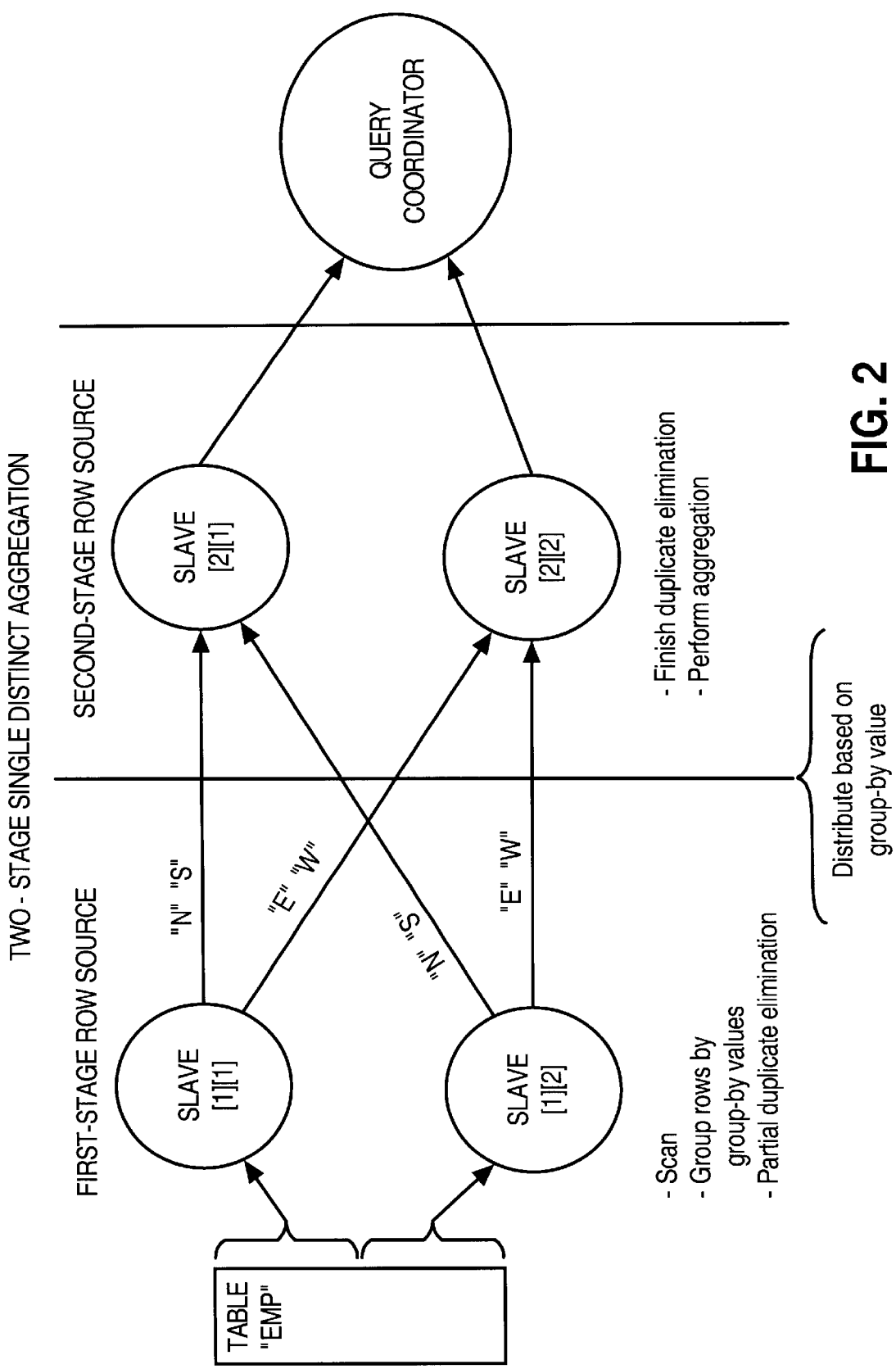
FIG. 2 is a block diagram illustrating techniques for performing a two-stage distinct aggregation operation according to an embodiment of the invention.

Techniques for parallelizing distinct aggregation operations are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided for executing distinct aggregation operations in a manner that is more scalable and efficient than prior techniques. For distinct aggregate operations that involve a single distinct-key column (e.g. Q1), a two stage parallelization technique is provided in which much of the processing responsibility is pushed down to the first-stage row source, whose degree of parallelism is not limited by the group-by values. Specifically, the processes in the first-stage row source form the rows they scan into groups, and eliminate duplicates from those groups. The groups are then passed to a second-stage row source where the duplicate elimination is completed, and the set aggregation is performed.

According to another aspect of the invention, a technique is provided for parallelizing distinct aggregation operations that involve multiple distinct-key columns, but do not require grouping, such as in the following query (Q2):

select region, count(distinct mgr), count(distinct age)
   from emp

For non-grouping, multiple-distinct aggregation operations, a two stage parallelization technique is provided in which much of the processing responsibility is pushed down to the first-stage row source, whose degree of parallelism is not limited by the number of distinct values. Specifically, the processes in the first-stage row source split the rows they scan into "row pieces", where each piece created from a row is associated with a different distinct-key column. The first-stage row source groups the row pieces based on the distinct-key column with which they are associated, and eliminates duplicates from those groups. The groups are then passed to a second-stage row source where the duplicate elimination is completed, and the set aggregation is performed.

According to another aspect of the invention, a three-stage technique is provided to parallelize aggregation operations that involve both grouping and multiple distinct-key columns, such as in the following query (Q3):

select region, count(distinct mgr), count(distinct age)
   from emp
   group by region As shall be described in greater detail hereafter, such queries are handled by splitting rows into as many pieces as there are distinct aggregates in the query, and processing the row pieces. During the first-stage, the set of slave processes in a first row source scans the rows of the base tables and performs partial duplicate elimination. During the second-stage, the set of slave processes in a second row source completes the duplicate elimination and performs partial set function aggregation. During the third-stage, a third set of slave processes in a third row source completes the set aggregation to produce the results of the distinct aggregation operation.

Two-Stage Single-Distinct Aggregation

Techniques are provided for performing distinct aggregation operations that involve a single distinct-key column (single-distinct aggregations) in two stages. The row sources involved in the first and second-stages are respectively referred to as the first and second-stage row sources. For the purpose of explanation, reference shall be made to the single-distinct aggregation operation specified by Q1:

select count (distinct mgr)
   from emp
   group by region

The various stages of single-distinct aggregation shall now be described with reference to FIG. 2.

The First-Stage of Single-Distinct Aggregation

There is no restriction on the degree of parallelism of the first-stage row source. Each slave process in the first-stage row source is assigned to (1) scan a portion of the query's base table, (2) group the rows that it scans based on the group-by column values, and (3) perform duplicate elimination within those groups based on the distinct-key values. The duplicate elimination performed at this stage does not result in complete duplicate elimination because it is only performed relative to the members of each group that have been scanned by a particular slave process, rather than all members of each group.

For example, assume that (1) two slave processes are used in the first-stage row source to process query Q1 (as shown in FIG. 2), (2) the first slave process[1][1] is assigned the task of scanning the portion of table emp that includes rows 110–116, and (3) the second slave process[1][2] is assigned the task of scanning the portion of table emp that includes rows 118–124.

After scanning rows 110–116, slave process[1][1] groups the rows as follows:

Group N1:
      <N, X>(from row 110)
      <N, X>(from row 116)
   Group S1:
      <S, Y>(from row 112)
   Group E1:
      <E, Z>(from row 114)

It should be noted that only the columns that are referenced in the query are relevant to the processing. In the present example, those columns are the region and mgr columns, so only values from those columns are shown. After duplicate elimination, slave process[1][1] has the following rows:

Group N1:
      <N, X>
   Group S1:
      <S, Y>
   Group E1:
      <E, Z>

After scanning rows 118–124, slave process[1][2] groups the rows as follows:

Group N2:
      <N, A>(from row 122)
   Group S2:
      <S, X>(from row 118)
      <S, Y>(from row 124)
   Group W2:
      <W, A>(from row 120)

During duplicate elimination, slave process[1][2] does not eliminate any rows because no group formed by slave process[1][2] has two or more rows with the same mgr value. As is evident by this example, not all duplicates have been eliminated by the processes in the first-stage row source. Specifically, two rows remain where "S" is the group-by value and "Y" is the mgr value, one of which belongs to the group S1 formed by slave process[1][1], and the other of which belongs to the group S2 formed by slave process[1][2].

After forming groups and eliminating duplicates, the slave processes in the first-stage pass their rows to the slave processes in the second-stage.

The Second-Stage of Single-Distinct Aggregation

Each slave process in the second-stage row source is associated with a set of one or more group-by values. Thus, the degree of parallelism at the second-stage is limited to the total number of distinct values in the group-by column. In the present example, there are four distinct values in the group-by column "region", therefore the second-stage may have a maximum of four slave processes. For the purpose of explanation, it shall be assumed that the second-stage row source has only two slave processes (slave process[2][1] and slave process[2][2]), where slave process[2][1] is assigned the group-by values "N" and "S", and slave process[2][2] is assigned the group-by values "E" and "W".

Each first-stage slave process sends each row group that it has formed to the second-stage slave process responsible for the group-by value associated with the row group. For example, slave process[2][1] is associated with group-by values "N" and "S", so slave process[1][1] sends row groups N1 and S1 to slave process[2][1]. Similarly, slave process [1][2] sends row groups N2 and S2 to slave process[2][1]. Slave process[2][2] is associated with group-by values "E" and "W", so slave process[1][1] sends row group E1 to slave process[2][2], and slave process[1][2] sends row group W2 to slave process[2][2].

When all of the rows are received from the first row source, slave process[2][1] has the row groups:

Group N:
   <N, X>
   <N, A>
Group S:
   <S, Y>
   <S, X>
   <S, Y>

Slave process[2][2] has the row groups:

Group E:
   <E, Z>
Group W:
   <W, A>

Upon receiving the rows from the first-stage row source, the slave processes in the second-stage row source complete the duplicate elimination by eliminating duplicate rows in the groups with which they are associated. In the present example, group S, managed by slave process[2][1], contains rows that have duplicate distinct-key values. Specifically, group S includes two rows that have "Y" for the mgr column. Therefore, slave process[2][1] eliminates one of those rows. The resulting group S has only the two rows <S, Y> and <S, X>. No other groups have rows with duplicate distinct-key values, so duplication elimination is complete.

After duplicate elimination, the slave processes in the second-stage row source perform the specified set aggregation operation to aggregate the rows in each group. In the present example, the set aggregation function specified in query Q1 is "count". Therefore, slave process[2][1] aggregates groups N and S to respectively produce the rows <N, 2> and <S, 2>. Similarly, slave process[2][2] aggregates groups E and W to respectively produce the rows <E, 1> and <W, 1>. The rows produced by the second-stage row source are then provided as the results of the distinct aggregation operation. This may involve, for example, transmitting the produced rows to a query coordinator process that is responsible for coordinating the execution of the query.

Query Q1 includes a group-by clause, thus necessitating the duplicate elimination to be performed within row groups formed by group-by value. If query Q1 did not include a group-by clause, the first-stage slave processes would perform duplicate elimination between all rows that they scan. All of the rows that remain may be sent to a single second-stage slave process (or back to the query coordinator), which would then complete the duplicate elimination and perform the set aggregation.

Two-Stage Non-Grouping Multiple-Distinct Aggregation

Techniques are provided for performing distinct aggregation operations that involve multiple distinct-key columns with no grouping (non-grouping multiple-distinct aggregations) in two stages. As with the description of the single-distinct aggregation, the row sources involved in the first and second-stages of the non-grouping multiple-distinct aggregation operation are respectively referred to as the first and second-stage row sources. For the purpose of explanation, reference shall be made to the non-grouping multiple-distinct aggregation operation specified by Q2:

select region, count(distinct mgr), count(distinct age)
from emp

The various stages of non-grouping multiple-distinct aggregation shall now be described with reference to FIG. 3.

The First-Stage of Non-Grouping Multiple-Distinct Aggregation

There is no restriction on the degree of parallelism of the first-stage row source. Each slave process in the first-stage row source is assigned to (1) scan a portion of the query's base table, (2) split the rows that it scans into row pieces based on the distinct-key columns, (3) group the row pieces based on the distinct-key columns, and (4) perform duplicate elimination within those groups based on the distinct-key values. The duplicate elimination performed at this stage does not result in complete duplicate elimination because it is only performed relative to the members of each group that have been scanned by a particular slave process, rather than all members of each group.

Figure 3:
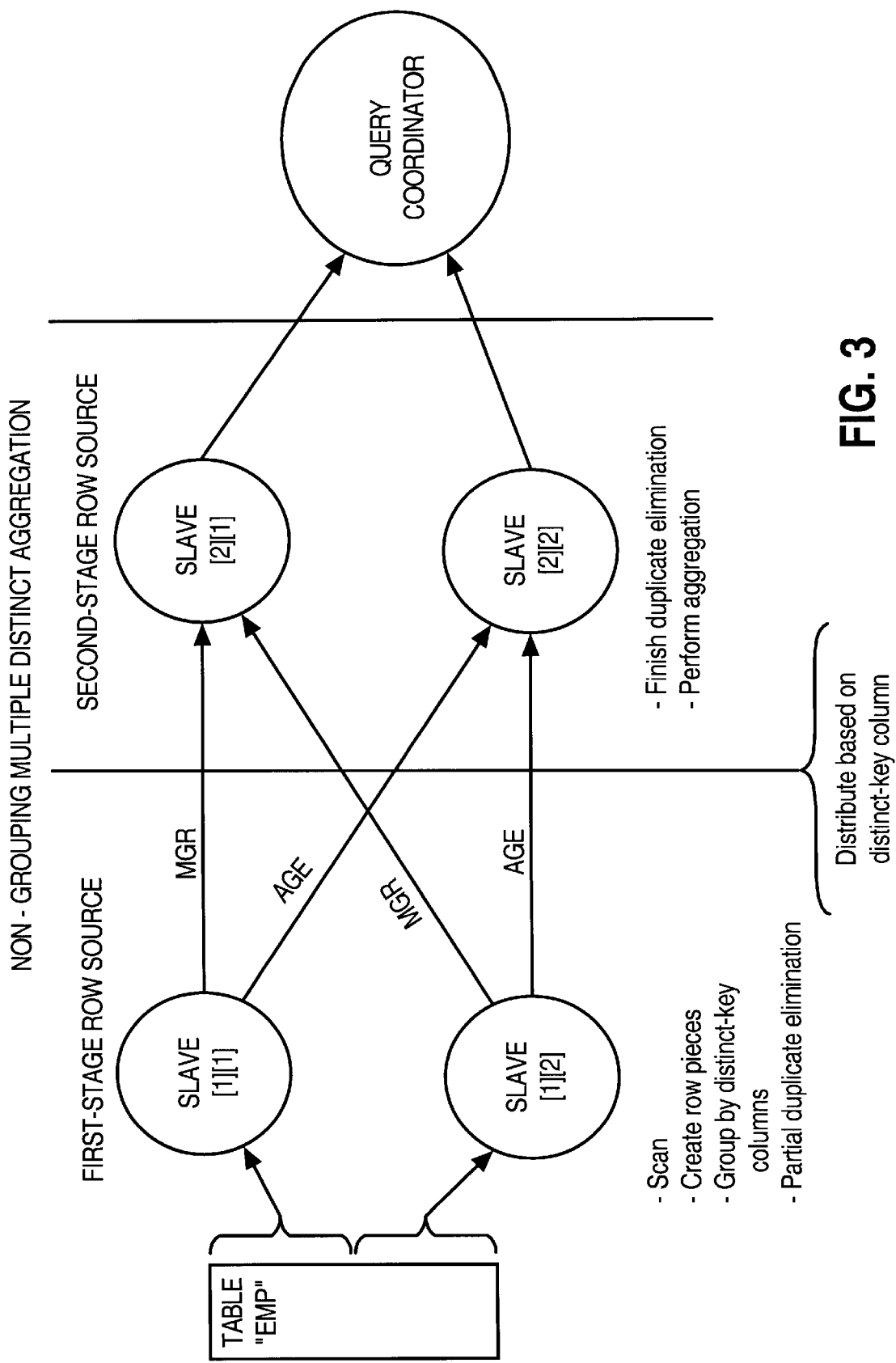
FIG. 3 is a block diagram illustrating techniques for performing a two-stage non-grouping multiple distinct aggregation operation according to an embodiment of the invention.

For example, assume that (1) two slave processes are used in the first-stage row source to process query Q2 (as shown in FIG. 3), (2) the first slave process slave process[1][1] is assigned the task of scanning the portion of table emp that includes rows 110–116, and (3) the second slave process slave process[1][2] is assigned the task of scanning the portion of table emp that includes rows 118–124.

After scanning the rows, each row source breaks the rows into a set of row pieces. The set of row pieces into which a row is broken consists of one row piece per distinct-key column. In the present example, Q2 has two distinct-key columns: mgr and age. Thus, every scanned row produces one row piece for "mgr" and one row piece for "age".

The row piece created from a row for a particular distinct-key column includes (1) a value that identifies the particular distinct-key column (referred to herein as a "column-code"), and (2) the value contained in the row for that distinct-key column. For example, assume that the column-code used to identify "mgr" is mgr-code, and that the column-code used to identify "age" is age-code. Under these conditions, slave process[1][1] would split row 110 into the row pieces <mgr-code, X> and <age-code, 21>. Similarly, slave process [1][1] would split row 112 into the row pieces <mgr-code, Y> and <age-code, 20>. Slave process[1][1] would split row 114 into the row pieces <mgr-code, Z> and <age-code, 33>. Slave process[1][1] would split row 116 into the row pieces <mgr-code, X> and <age-code, 35>.

Slave process[1][1] groups the row pieces based on distinct-key column as follows:

Group MGR-CODE-1:
   <mgr-code, X>
   <mgr-code, Y>
   <mgr-code, Z>
   <mgr-code, X>
Group AGE-CODE-1:
   <age-code, 21>
   <age-code, 20>
   <age-code, 33>
   <age-code, 35>

Slave process[1][1] then performs duplicate elimination among the members of each group. In the present example, duplicate elimination results in the elimination of one of the <mgr-code, X> entries of group MGR-CODE-1.

Slave process[1][2] performs on rows 118–124 tasks similar to those performed by slave process[1][1] on rows 110–116, described above. After splitting the rows into row pieces, and grouping the rows based on column-code values, the groups formed by slave process[1][2] include:

Group MGR-CODE-2:
   <mgr-code, X>
   <mgr-code, A>
   <mgr-code, A>
   <mgr-code, Y>

Group AGE-CODE-2:
   <age-code, 21>
   <age-code, 40>
   <age-code, 41>
   <age-code, 20>

Slave process[1][2] then performs duplicate elimination among the members of each group. In the present example, duplicate elimination results in the elimination of one of the <mgr-code, A> entries of group AGE-CODE-2.

After performing duplicate elimination, the slave processes in the first-stage row source send the row pieces to processes within the second-stage row source.

The Second-Stage of Non-Grouping Multiple-Distinct Aggreation

Each slave process in the second-stage row source is associated with a set of one or more column-codes. For example, a slave process in the second-stage row source may be associated with the column-code mgr-code. Each first-stage slave process sends the row pieces it produces to the second-stage slave process responsible for the column-code associated with the row piece. For example, a row piece <mgr-code, A> would be sent to the second-stage slave process responsible for the column-code mgr-code.

In the present example, it shall be assumed that the second-stage row source has two (slave processes slave process[2][1] and slave process[2][2]), that are respectively associated with column-codes mgr-code and age-code. Thus, slave process[2][1] receives row pieces:

<mgr-code, X>
<mgr-code, Y>
<mgr-code, Z> from slave process[1][1], and receives row pieces:

<mgr-code, X>
<mgr-code, A>
<mgr-code, Y> from slave process[1][2]. Similarly, slave process[2][2] receives row pieces:

<age-code, 21>
<age-code, 20>
<age-code, 33>
<age-code, 35> from slave process[1][1] and row pieces:

<age-code, 21>
<age-code, 40>
<age-code, 41>
<age-code, 20> from slave process[1][2]. Each second-stage row source performs duplicate elimination among those row pieces that share the same column-code. In the present example, all row pieces received by slave process[2][1] are associated with the same column-code "mgr-code". Hence, slave process[2][1] performs duplicate elimination among all of the row pieces that it receives. Similarly, all row pieces received by slave process[2][2] are associated with "age-code". Hence, slave process[2][2] performs duplicate elimination among all of the row pieces that it receives.

After duplicate elimination, slave process[2][1] remains with row pieces:

<mgr-code, Z>
<mgr-code, X>
<mgr-code, A>
<mgr-code, Y>

After duplicate elimination, slave process[2][2] remains with row pieces:

<age-code, 21>
<age-code, 20>
<age-code, 33>
<age-code, 35>
<age-code, 40>
<age-code, 41>

After performing duplicate elimination, each second-stage slave process performs the appropriate set aggregation on each set of row pieces that remain. For example, mgr-code is associated with the distinct-key column "mgr". Query Q2 applies the "count" function to the distinct values in "mgr". Consequently, slave process[2][1] applies the "count" function to the slave process pieces associated with mgr-code. In the present example, applying the count function to the row pieces associated with mgr-code yields the value "4" for the "mgr" column.

Similarly, age-code is associated with the distinct-key column "age". Query Q2 applies the "count" function to the distinct values in "age". Consequently, slave process[2][2] applies the "count" function to the slave process pieces associated with age-code. In the present example, applying the "count" function to the row pieces associated with age-code yields the value "6" for the "age" column.

The rows produced by the second-stage row source are then combined into a result row that reflects the results of the distinct aggregation operations. This may involve, for example, transmitting the row pieces to a query coordinator process that is responsible for coordinating the execution of the query. In the present example, the result row is <4, 6>, where 4 is the number of distinct mgr values in emp and 6 is the number of distinct age values in emp.

Three-Stage Multiple-Distinct Aggregation

Techniques are provided for performing, in three stages, distinct aggregation operations that involve a multiple distinct-key columns and grouping. The row sources involved in the first, second and third-stages are respectively referred to as the first, second, and third-stage row sources. For the purpose of explanation, reference shall be made to the distinct aggregation operation specified by Q3:

select region, count(distinct mgr), count(distinct age)
   from emp
   group by region Techniques for performing three-stage distinct aggregation operations that involve multiple distinct-key columns and grouping shall be described with reference to FIG. 4.

The First-Stage of Multiple-Distinct Aggregation with Grouping

There is no restriction on the degree of parallelism of the first-stage row source. Each slave process in the first-stage row source is assigned to (1) scan a portion of the query's base table, (2) split the rows that it scans into row pieces based on the distinct-key columns, (3) group the row pieces based on <group-by value, distinct-key column> combinations, and (4) perform duplicate elimination within those groups based on the distinct-key values. The duplicate elimination performed at this stage does not result in complete duplicate elimination because it is only performed relative to the members of each group that have been scanned by a particular slave process, rather than all members of each group.

Figure 4:
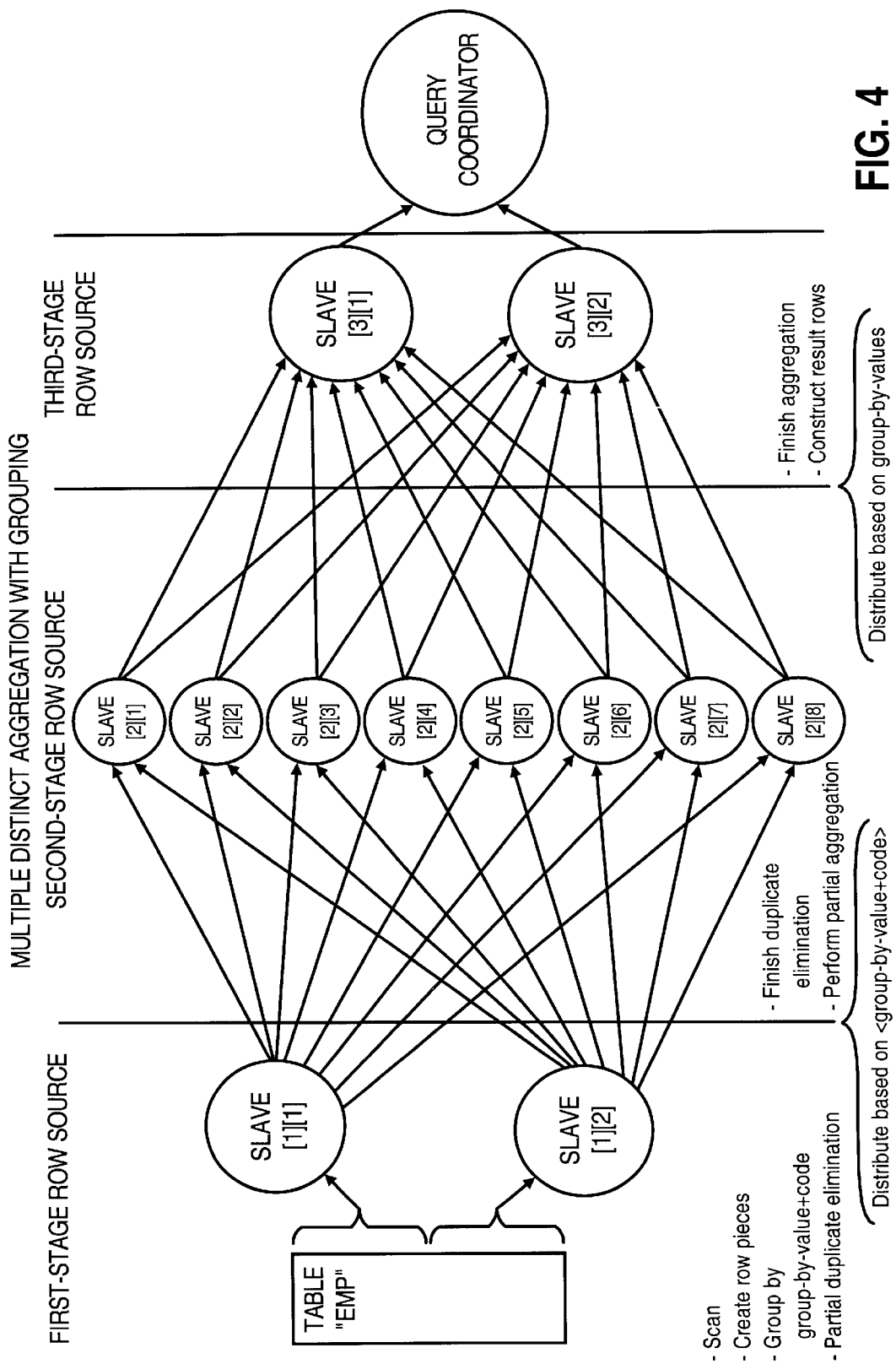
FIG. 4 is a block diagram illustrating techniques for performing a three-stage, multiple distinct aggregation operation with grouping, according to an embodiment of the invention.

For example, assume that
(1) two slave processes are used in the first-stage row source to process query Q3 (as illustrated in FIG. 4),
(2) the first slave process slave process[1][1] is assigned the task of scanning the portion of table emp that includes rows 110–116, and
(3) the second slave process slave process[1][2] is assigned the task of scanning the portion of table emp that includes rows 118–124.

After scanning the rows, each row source breaks the rows into a set of row pieces. The set of row pieces into which a row is broken consists of one row piece per distinct-key column. In the present example, Q3 has two distinct-key columns: mgr and age. Thus, every scanned row produces one row piece for "mgr" and one row piece for "age".

The row piece created from a row for a particular distinct-key column includes (1) a column-code corresponding to a distinct-key column, (2) the group-by value contained in that row, and (2) the value contained in the row for that distinct-key column. For example, assume that the column-code used to identify "mgr" is mgr-code, and that the column-code used to identify "age" is age-code. Under these conditions, slave process[1][1] would split row 110 into the row pieces <N, mgr-code, X> and <N, age-code, 21>. Similarly, slave process[1][1] would split row 112 into the row pieces <S, mgr-code, Y> and <S, age-code, 20>. Slave process[1][1] would split row 114 into the row pieces <E, mgr-code, Z> and <E, age-code, 33>. Slave process[1][1] would split row 116 into the row pieces <N, mgr-code, X> and <N, age-code, 35>.

Slave process[1][1] would group the row pieces based on <distinct-key code, group-by values> combinations as follows:

Group N-MGR-CODE-1:
<N, mgr-code, X>
<N, mgr-code, X>
Group S-MGR-CODE-1:
<S, mgr-code, Y>
Group E-MGR-CODE-1:
<E, mgr-code, Z>
Group N-AGE-CODE- 1:
<N, age-code, 21>
<N, age-code, 35>
Group S-AGE-CODE-1:
<S, age-code, 20>
Group E-AGE-CODE-1:
<E, age-code, 33>

Slave process[1][1] then performs duplicate elimination among the members of each group. In the present example, duplicate elimination results in the elimination of one of the <N, mgr-code, X> entries of group N-MGR-CODE-1.

Slave process[1][2] performs on rows 118–124 tasks similar to those performed by slave process[1][1] on rows 110–116, described above. After splitting the rows into row pieces, and grouping the rows based on column-code values, the groups formed by slave process[1][2] include:

Group N-MGR-CODE-2:
<N, mgr-code, A>
Group S-MGR-CODE-2:
<S, mgr-code, X>
<S, mgr-code, Y>
Group W-MGR-CODE-2:
<W, mgr-code, A>
Group S-AGE-CODE-2:
<S, age-code, 21>
Group W-AGE-CODE-2:
<W, age-code, 40>
<W, age-code, 20>
Group N-AGE-CODE-2:
<N, age-code, 41>

Slave process[1][2] then performs duplicate elimination among the members of each group. In the present example, duplicate elimination does not result in the elimination of any row pieces created by slave process[1][2].

After performing duplicate elimination, the slave processes in the first-stage row source send the row pieces to processes within the second-stage row source.

The Second-Stage of Multiple-Distinct Aggregation with Grouping

Each slave process in the second-stage row source is associated with a set of one or more <group-by key, distinct-column code> combinations ("i.e. <group-by-value+column-code> values"). For example, a slave process in the second-stage row source may be associated with the <group-by-value+column-code> value "N-mgr-code". Another second-stage row source may be associated with the <group-by-value+column-code> value "S-mgr-code". Yet another second-stage row source may be associated with the <group-by-value+column-code> value "N-age-code".

Each first-stage slave process sends the row pieces it produces to the second-stage slave process responsible for the <group-by-value+column-code>value associated with the row piece. For example, a row piece <N, mgr-code, A> would be sent to the second-stage slave process responsible for the <group-by-value+column-code> value "N-mgr-code".

In the present example, it shall be assumed that the second-stage row source has eight slave processes, slave process[2][1], slave process[2][2], slave process[2][3], slave process[2][4] slave process[2][5], slave process[2][6], slave process[2][7], and slave process[2][8], which are respectively assigned the <group-by-value+column-code> values N-mgr-code, S-mgr-code, E-mgr-code, W-mgr-code, N-age-code, S-age-code, E-age-code, and W-age-code. Based on this mapping, the row pieces received by the second-stage slave processes are:

slave process[2][1] receives
<N, mgr-code, X>
<N, mgr-code, A>
slave process[2][2] receives
<S, mgr-code, Y>
<S, mgr-code, Y>
<S, mgr-code, X>
slave process[2][3] receives
<E, mgr-code, Z>
slave process[2][4] receives
<W, mgr-code, A>
slave process[2][5] receives <N, age-code, 21>
<N, age-code, 35>
<N, age-code, 41>
slave process[2][6] receives
<S, age-code, 20>
<S, age-code, 21>
slave process[2][7] receives
<E, age-code, 33>
slave process[2][8] receives
<W, age-code, 40>
<W, age-code, 20>

Each second-stage slave process eliminates duplicates among each <group-by-value+column-code> group that it has been assigned. In the present example, each second-stage slave process has been assigned a single <group-by-value+column-code> group, so each second-stage slave process eliminates duplicates among all row pieces that it receives. In the present example, duplicate elimination results in the elimination of one of the two <S, mgr-code, Y> row pieces received by slave process[2][2].

Because all row pieces with the same <group-by value, column-code, distinct column value> are received by the same second-stage slave process, the duplicate elimination performed by the second-stage slave processes eliminates all remaining duplicates.

Because duplicates have been eliminated, the second-stage slave processes are able to begin performing the appropriate set aggregation functions on the remaining row piece. The specific set aggregation performed on a set of row pieces is dictated by the function specified by the query for the distinct-key column associated with that set of row pieces. In the present example, query Q2 specifies the aggregate function "count" for both "age" and "mgr". Therefore, the second-stage slave processes count the number of rows for each <group-by value, distinct-key code> combination.

After performing the set aggregation, the resulting aggregated row pieces produced by second-stage slave process [2][1], slave process[2][2], slave process[2][3], slave process[2][4] slave process[2][5], slave process[2][6], slave process[2][7], and slave process[2][8] are, respectively, <N, mgr-code, 2>, <S, mgr-code, 2>, <E, mgr-code, 1>, <W, mgr-code, 1>, <N, age-code, 3>, <S, age-code, 2>, <E, age-code, 1>, and <W, age-code, 2>. At this point, the slave processes in the second-stage row source send the resulting row pieces to slave processes in the third-stage row source.

The Third-Stage of Multiple-Distinct Aggregation with Grouping

Each slave process in the third-stage row source is associated with a set of one or more group-by values. Thus, the degree of parallelism at the third-stage is limited to the total number of distinct values in the group-by column. In the present example, there are four distinct values in the group-by column "region", therefore the third-stage has a maximum of four slave processes. For the purpose of explanation, it shall be assumed that the third-stage row source has only two slave processes slave process[3][1] and slave process[3][2], where slave process[3][1] is assigned the group-by values "N" and "S", and slave process[3][2] is assigned the group-by values "E" and "W".

Each second-stage slave process sends each row piece that it has formed to the third-stage slave process responsible for the group-by value associated with the row piece. For example, slave process[3][1] is associated with group-by values "N" and "S", so slave process[2][1], slave process [2][2], slave process[2][5] and slave process[2][6] respectively send to slave process[3][1] row pieces: <N, mgr-code, 2>, <S, mgr-code, 2>, <N, age-code, 3>, <S, age-code, 2>.

Similarly, slave process[3][1] is associated with group-by values "E" and "W", so slave process[2][3], slave process [2][4], slave process[2][7], and slave process[2][8] respectively send to slave process[3][2] the row pieces: <E, mgr-code, 1>, <W, mgr-code, 1>, <E, age-code, 1>, and <W, age-code, 2>.

When all of the row pieces are received from the second row source, each third-stage slave process (1) completes the set aggregation, and (2) combines the row pieces into rows. In the present example, no further set aggregation is necessary during the third-stage because all rows corresponding to each particular <group-by-value+column-code> value were processed by the same second-stage slave process.

Each third-stage slave process creates a "result row" for each group-by value assigned to the slave process. Each result row thus created includes a group-by value and one value for each distinct aggregate column. The sequence of the values in the result rows correspond to the sequence of the columns specified in the SELECT statement of the query.

In the present example, slave process[3][1] combines row pieces <N, mgr-code, 2> and <N, age-code, 3> to form the result row <N, 2, 3>. Slave process[3][1] also combines row pieces <S, mgr-code, 2> and <S, age-code, 2> to form result row <S, 2, 2>.

Similarly, slave process[3][2] combines row pieces <E, mgr-code, 1> and <E, age-code, 1> to form result row <E, 1, 1>, and combines row pieces <W, mgr-code, 1> and <W, age-code, 2> to form result row <W, 1, 2>.

The result rows produced by the third-stage row source are then provided as the results of the distinct aggregation operation. This may involve, for example, transmitting the produced rows to a query coordinator process that is responsible for coordinating the execution of the query.

First-to-Second-Stage Row Piece Distribution

As explained above, first-stage slave processes distribute their row pieces to second-stage slave processes based on <group-by-value+column-code> values. In the embodiment described above, this distribution was performed by assigning one or more distinct <group-by-value+column-code> values to each second-stage slave process, and causing each first-stage slave process to transmit each of its row pieces to the second-stage slave process that has the corresponding <group-by-value+column-code> value. Distributing the row pieces in this manner allows the second-stage slave processes to perform all of the necessary set aggregation, since no two slave processes will receive row pieces that must be aggregated with each other. Consequently, the third-stage slave processes need not perform any aggregation. However, this distribution technique limits the degree of parallelism used at the second-stage to (gb×dkc), where gb is the number of distinct group by values, and dkc is the number of distinct-key columns.

In an alternative embodiment, the distribution of row pieces among the second-stage slave processes is performed using a hash function, where the hash key is <group-by-key+column-code+distinct-key-value>. For example, assume that the second-stage degree of parallelism is selected to be 10. The <group-by-key +column-code+ distinct-key-value> values associated with each row piece may be applied to a 10-bucket hash function to determine which of the ten second-stage slave processes should receive the row piece. For example, for the row piece <S, mgr-code, Y>, the hash key S+mgr-code+Y is applied to the hash function. The hash value thus produced dictates the second-level slave process to which the row piece should be sent.

When a hash function is used dictate the distribution of row pieces among second-stage slave processes, the degree of parallelism used in the second-stage is virtually unlimited. Further, using <group-by-key+column-code+distinct-key-value> hash key values ensures that all row pieces that (1) belong to the same group, (2) have the same distinct-key code and (3) have the same distinct-key value, will be sent to the same second-stage slave process. Consequently, the duplicate elimination performed by the second-stage slave processes results in the elimination of all duplicates.

However, using <group-by-key+column-code+distinct-key-value> hash key values does not guaranty that row pieces that (1) belong to the same group, (2) have the same column-code, but (3) have the different distinct-key values will be sent to the same second-stage slave process. For example, row pieces <N, age-code, 21> and <N, age-code, 35> may hash to different second-stage slave processes. Consequently, when the second-stage slave processes perform set function aggregation, the aggregate values they produce are only partial aggregates.

The partial aggregates created at the second-stage are sent to the third-stage slave processes. The distribution to the third-stage slave processes may be performed, for example, using an N-way hash function, where the maximum value of N is the number of distinct values in the group-by column. The hash key used for the second-stage to third-stage distribution is the group-by key contained in the row pieces. Using the group-by key as the hash key ensures that row pieces that belong to the same group will be sent to the same third-stage slave process. Consequently, each third-stage slave process will be able to complete the set function aggregation for the rows it receives, and to construct the result rows for the one or more group-by values that hash to the slave process.

In an alternative embodiment, the hash key used for the second-stage to third-stage distribution is the <group-by-key+column-code> combination. Using <group-by-key+column-code> hash key values ensures that all row pieces that (1) belong to the same group, and (2) have the same distinct-key code will be sent to the same third-stage slave process. Consequently, the set aggregation performed by the third-stage slave processes completes the set function aggregation.

However, using <group-by-key+column-code> hash key values does not guaranty that row pieces that (1) belong to the same group but (2) have different column-codes will be sent to the same third-stage slave process. For example, row pieces <N, age-code, 2> and <N, mgr-code, 3> may hash to different third-stage slave processes. Consequently, the third-level slave processes may not have all of the aggregated row pieces required to construct the result rows. In this embodiment, the third-stage slave processes send the pre-aggregated row pieces to a fourth-stage row source that constructs the result rows of the query. The distribution to the slave processes in the fourth-stage is performed based on the group-by-key to ensure that all row pieces associated with the same group-by value are sent to the same fourth stage slave processes. The fourth stage slave processes construct the result rows from the row pieces they receive, and supply the result rows as the result of the query.

Non-Distinct Columns

A query that specifies a distinct aggregation operation with multiple distinct-key columns and grouping may also specify an aggregation operation for one or more nondistinct columns. For example, the following query (Q4) requires a count of the empno values by region, and an average of age by region, without first performing duplicate elimination on the empno and age values:

select region, count(distinct mgr), count(distinct age),
  count(empno), avg(age)
from emp
group by region According to one embodiment, when the first-stage slave processes split the rows into row pieces, a row piece is also generated for the non-distinct columns. Thus, slave process [1][1] would split row 112 into the row pieces: <S, mgr-code, Y>, <S, age-code, 20>, <S, non-distinct-code, 2, 20>. The non-distinct column row piece <S, non-distinct-code, 2, 20> includes the code "non-distinct-code" to indicate that it should be handled differently than the other row pieces. Specifically, no duplicate elimination need be performed on such row pieces prior to applying the set aggregation functions.

According to one embodiment, the first-stage slave processes perform partial aggregation on the non-distinct row pieces that they create. Specifically, the first-level slave processes group the non-distinct row pieces based on group-by value, and then apply the aggregation functions.

In an alternate embodiment, the first-stage slave processes may not perform any aggregation on the non-distinct row pieces. Rather, the first-stage slave processes may simply forward the non-distinct row pieces to the appropriate second-stage slave processes, where the second-stage slave processes perform the aggregation.

In embodiments that distribute row pieces to the second-stage slave processes based on <group-by-value+column-code> values, all non-distinct column row pieces that are associated with the same group-by value will be delivered to the same second-stage slave process. In such embodiments, the second-stage slave processes can complete the aggregation of the non-distinct row pieces.

In embodiments that distribute row pieces to the second-stage slave processes based on <group-by-value+code+values>, it is possible for non-distinct row pieces that belong to the same group to go to different second-stage slave processes. Consequently, the third-stage slave processes are responsible for completing the set aggregation of the non-distinct row pieces.

Alternatively, an embodiment that distributes row pieces to the second-stage slave processes based on <group-by-value+code+values> hash key values may treat non-distinct row pieces differently than other row pieces. Specifically, upon determining that row pieces include the non-distinct-code, first-stage slave processes distribute the non-distinct row pieces to the second-stage slave processes in a way that ensures that all nondistinct row pieces that belong to the same group will go to the same second-stage slave process.

For example, even though other row pieces are distributed based on a <group-by-value+code+value> hash key, the non-distinct row pieces may be distributed based on a <group-by-value+code> hash key. Use of a <group-by-value+code> hash key to distribute the non-distinct row pieces ensures that all non-distinct row pieces that have the same group-by value will be delivered to the same second-stage row source. Consequently, the second-stage slave processes can complete the aggregation operations on such row pieces.

Instructing Slave Processes

In the foregoing description, the tasks that are assigned to the slave processes of the various row sources used in a parallel distinct aggregate operation have been described. The mechanism by which the slave processes are instructed to perform their assigned tasks may vary from implementation to implementation. The present invention is not limited to any particular technique for instructing slave processes. One technique that may be used to instruct slave processes, according to one embodiment, involves generating SQL statements that specify the specific tasks required of the slave processes, and passing the SQL statements to the appropriate slave processes for execution. In one embodiment that generates slave-process-specific SQL statements, the operators "MAKE_PSR" and "CAST_PSR" are used.

MAKE_PSR and CAST_PSR are operators defined to refer to the row pieces in SQL. These operators are mainly type checking functions. The MAKE_PSR operator allows different kinds of row pieces to be passed in the same column. The CAST_PSR operator allows each kind of row piece to be separately referenced. MAKE_PSR takes as arguments all aggregation functions in the query block. For example, the two SQL expressions in Q3 that specify distinct aggregation operations are: "count (distinct mgr)" and "count (distinct age)". CAST_PSR takes two arguments. The first argument is a MAKE_PSR operator that specifies the partial sort record (row piece) input to a slave process. The second argument is an index that specifies which aggregation function the first argument is for.

In one embodiment, the SQL statements issued to the slave processes that belong to the first-stage row source that is executing Q3 use MAKE_PSR as follows:

select region, MAKE_PSR ((count (distinct mgr)),
       (count (distinct age)))
    from X
    group by region In this statement, X represents a portion of the emp table, which will differ for each first-stage slave process. In response to executing this statement, the first-stage slave processes perform the operations described above.

The slave-process-specific SQL statements issued to the slave processes that belong to the second-stage row source may have the following form:

select region, MAKE_PSR(
       (count (distinct (CAST_PSR(mgr, 1)))),
       (count (distinct (CAST_PSR(age, 2)))))
    from RS1
    group by region In this statement, RS1 indicates that the second-slave processes receive the row pieces that they process from the first-stage row source. The MAKE_PSR generates, from the results of the other operations, the row pieces that are supplied to the third-stage slave processes.

The slave-process-specific SQL statements issued to the slave processes that belong to the third-stage row source may have the following form:

select region,
       (count (distinct (CAST_PSR(mgr, mgr-code)))),
       (count (distinct (CAST_PSR(age, age-code))))
    from RS2
    group by region This statement is similar to those executed at the second-stage. However, MAKE_PSR is not invoked because the third stage produces result rows, where each row combines the row pieces associated with each of the distinct-key columns.

Hardward Overview

Figure 5:
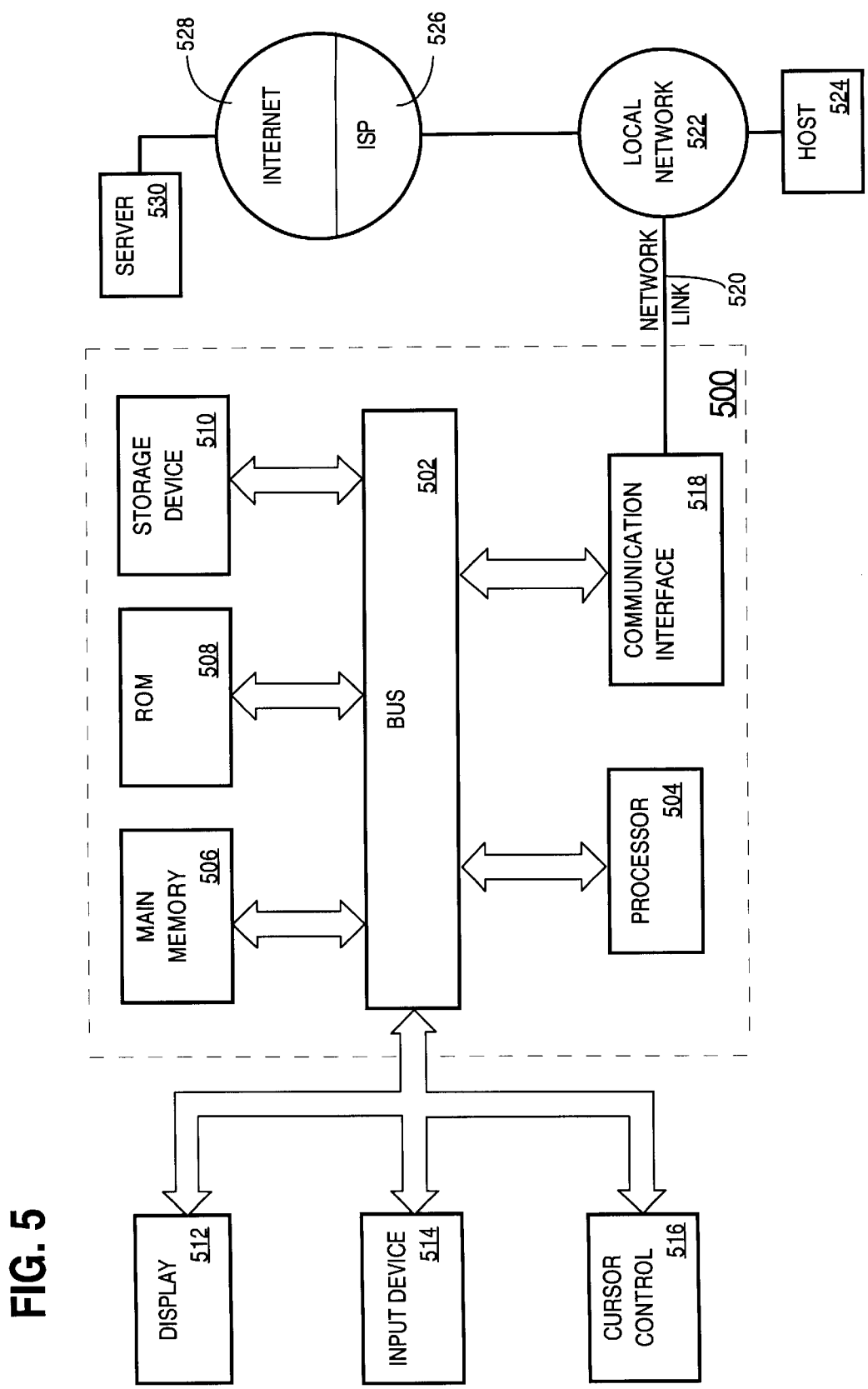
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions. to be executed by processor 504. Computer system 500 further includes a read only memory (RAM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a second axis (e.g., x) and a third axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing distinct aggregate operations that involve a single distinct-key column, the method comprising the steps of:

causing each slave process in a first set of slave processes to perform the steps of:
scanning rows from a data source, wherein each slave in said first set of slaves scans rows from a different portion of said data source;
grouping the rows scanned from said data source into a first set of groups based on values associated with a group-by column;
eliminating duplicate rows within each group of said first set of groups; and
after eliminating duplicate rows, distributing the remaining rows to a second set of slave processes, wherein the slave process within said second set of slave processes to which a given row is distributed is based on a value within that given row for said group-by column; and causing each slave process in the second set of slave processes to perform the steps of:
grouping rows received from said first set of slave processes into a second set of groups based on said group-by column, and
eliminating duplicate rows within each group of the second set of groups;
after eliminating duplicate rows, aggregating the remaining rows according to a set aggregation function.

2. A method for performing distinct aggregate operations that involve a plurality of distinct-key columns and no grouping, the method comprising the steps of:

causing each slave process in a first set of slave processes to perform the steps of:
scanning rows from a data source, wherein each slave in said first set of slaves scans rows from a different portion of said data source;
generating row pieces from the scanned rows, wherein each scanned row is used to generate a row piece for each distinct-key column of said plurality of distinct-key columns;
grouping the row pieces into a first set of groups based on the distinct-key columns with which the row pieces are associated;
eliminating duplicate row pieces within each group of said first set of groups; and
after eliminating duplicate row pieces, distributing the remaining row pieces to a second set of slave processes, wherein the slave process within said second set of slave processes to which a given row is distributed is based on the distinct-key column associated with the given row; and causing each slave process in the second set of slave processes to perform the steps of:
grouping rows received from said first set of slave processes into a second set of groups based on said distinct-key column;
eliminating duplicate rows within each group of the second set of groups; and
after eliminating duplicate rows, aggregating the remaining rows in each group according to a set aggregation function associated with the distinct-key column that is associated with the group.

3. The method of claim 2 further comprising the step of, after aggregating the remaining row pieces in each group, combining the row pieces to form result rows, wherein each result row includes a value for each distinct-key column of said plurality of distinct-key columns.

4. The method of claim 2 wherein the step of generating row pieces includes the steps of:

generating codes for each of said distinct-key columns; and storing, within each row piece generated for a given distinct-key column, the code associated with said given distinct-key column.

5. The method of claim 4 wherein the step of distributing includes applying, for each row piece, a hash key to a hash function to produce a hash value, wherein the hash key for each row piece includes the code stored in said row piece, wherein the slave process in said second set of slave processes to which the row piece is sent is determined by said hash value.

6. A method for performing a distinct aggregate operation that involves a plurality of distinct-key columns and grouping, wherein the grouping is based on group-by values, the method comprising the steps of:

causing each slave process in a first set of slave processes to perform the steps of:
  scanning rows from a data source, wherein each slave in said first set of slaves scans rows from a different portion of said data source;
  generating row pieces from the scanned rows, wherein each scanned row is used to generate a row piece for each distinct-key column of said plurality of distinct-key columns;
  grouping the row pieces into a first set of groups based on the distinct-key columns with which the row pieces are associated, and the group-by values with which the row pieces are associated;
  eliminating duplicate row pieces within each group of said first set of groups; and
  after eliminating duplicate row pieces, distributing the remaining row pieces to a second set of slave processes, wherein the slave process within said second set of slave processes to which a given row piece is distributed determined is based on the distinct-key column associated with the given row piece, and the group-by value associated with the given row piece; and
 causing each slave process in the second set of slave processes to perform the steps of:
  grouping row pieces received from said first set of slave processes into a second set of groups based on the distinct-key columns associated with the row pieces, and the group-by value associated with the row pieces; and
  eliminating duplicate row pieces within each group of the second set of groups; and
  after eliminating duplicate row pieces, aggregating the remaining row pieces in each group according to a set aggregation function associated with the distinct-key column that is associated with the group; and
  after aggregating the remaining row pieces in each group, distributing the row pieces to a third set of slave processes, wherein the slave process within said third set of slave processes to which a given row piece is distributed is determined based on the group-by value associated with the given row piece; and
 causing each slave process in the third set of slave processes to combine the row pieces received from the second set of slave processes to produce result rows.

7. The method of claim 6 wherein the slave process within said second set of slave processes to which a given row piece is distributed determined is based on:

the distinct-key column associated with the given row piece, the group-by value associated with the given row piece, and the value in said given row piece for the distinct-key column associated with the given row piece.

8. The method of claim 7 wherein, prior to combining said row pieces, each slave process in said third set of slave processes performs the steps of:

grouping row pieces received from said second set of slave processes into a third set of groups based on the distinct-key columns associated with the row pieces, and the group-by value associated with the row pieces; and
 aggregating the row pieces in each group according to a set aggregation function associated with the distinct-key column that is associated with the group.

9. The method of claim 6 wherein:

the distinct aggregate operation is specified in a statement;
 the statement specifies one or more aggregation operations for one or more non-distinct columns;
 the method includes the steps of:
  said first set of slave processes generating a set of row pieces for the one or more non-distinct columns;
  the first set of slave processes delivering said set of row pieces to said second set of slave processes without performing duplicate elimination on said set of row pieces.

10. The method of claim 9 further including the step of, prior to delivering said set of row pieces to said second set of slave processes, said first set of slave processes performing partial aggregation of said set of row pieces.

11. The method of claim 10 further comprising the step of said second set of slave processes finishing aggregation of said set of row pieces.

12. The method of claim 9 wherein said first set of slave processes delivers said set of row pieces to said second set of slave processes without performing any aggregation on said set of row pieces.

13. The method of claim 9 further comprising the step of storing within each row piece of said set of row pieces a code that indicates that said row piece is associated with one or more non-distinct columns.

14. The method of claim 6 wherein the step of generating row pieces includes the steps of:

generating codes for each of said distinct key columns; and
 storing, within each row piece generated for a given distinct-key column, the code associated with said given distinct-key column.

15. The method of claim 14 wherein the step of distributing includes applying, for each row piece, a hash key to a hash function to produce a hash value, wherein the hash key for each row piece includes the code stored in said row piece, wherein the slave in said second set of slave processes to which the row piece is sent is determined by said hash value.

16. The method of claim 15 wherein, for each row piece, said hash key includes the value, stored in the row piece, for the non-distinct column associated with the row piece.

17. A method of performing a distinct aggregation operation, the method comprising the steps of:

causing a first set of slave processes to perform the steps of
  scanning data;
  performing partial duplicate elimination on said data;
  sending said data to a second set of slave processes;
 causing said second set of slave processes to perform the steps of;

finishing duplicate elimination on said data;
performing partial aggregation of said data;
sending said data to a third set of slave processes; and
causing said third set of slave processes to finish aggregation of said data.

18. The method of claim 17 further comprising the steps of:
causing said first set of slave processes to perform the steps of
generating a plurality of row pieces from said data;
distributing each row piece of said plurality of row pieces to said second set of slave processes based on:
a distinct-key column associated with the row piece,
a group-by value associated with the row piece; and
a value for said distinct-key column that is associated with the row piece.

19. The method of claim 18 wherein:
the step of sending said data to a third set of slave processes includes sending a particular set of row pieces to said third set of slave processes;
the second set of slave processes distribute each row piece of said particular set of row pieces to said third set of slave processes based on:
a group-by value associated with the row piece;
the method further includes the step of the third set of slaves combining row pieces to create result rows.

20. A computer-readable medium carrying one or more sequences of instructions for performing distant aggregate operations that involve a single distinct-key column, wherein execution of the one or more sequences of instructions by one or more processors causes the one or more processors to perform the steps of:
causing each slave process in a first set of slave processes to perform the steps of:
scanning rows from a data source, wherein each slave in said first set of slaves scans rows from a different portion of said data source;
grouping the rows scanned from said data source into a first set of groups based on values associated with a group-by column;
eliminating duplicate rows within each group of said first set of groups: and
after eliminating duplicate rows, distributing the remaining rows to a second set of slave processes, wherein the slave process within said second set of slave processes to which a given row is distributed is based on a value within that given row for said group-by column; and
causing each slave process in the second set of slave process to perform the steps of:
grouping rows received from said first set of slave processes into a second set of groups based on said group-by column, and
eliminating duplicate rows within each group of the second set of groups;
after eliminating duplicate rows, aggregating the remaining rows according to a set aggregation function.

21. A computer-readable medium carrying one or more sequences of instructions for performing distinct aggregate operations that involve a plurality of distant-key columns and no grouping, wherein execution of the one or more sequences of instructions by one or more processors causes the one or more processors to perform the steps of:
causing each slave process in a first set of slave processes to perform the steps of:
scanning rows from a data source, wherein each slave in said first set of slaves scans rows from a different portion of said data source;
generating row pieces from the scanned rows, wherein each scanned row is used to generate a row piece for each distinct-key column of said plurality of distinct-key columns;
grouping the row pieces into a first set of groups based on the distinct-key columns with which the row pieces are associated;
eliminating duplicate row pieces within each group of said first set of groups; and
after eliminating duplicate row pieces, distributing the remaining row pieces to a second set of slave processes, wherein the slave process within said second set of slave processes to which a given row is distributed is based on the distinct-key column associated with the given row; and
causing each slave process in the second set of slave processes to perform the steps of:
grouping rows received from said first set of slave processes into a second set of groups based on said distinct-key column;
eliminating duplicate rows within each group of the second set of groups; and
after eliminating duplicate rows, aggregating the remaining rows in each grouping according to a set aggregation function associated with the distinct-key column that is associated with the group.

22. The computer-readable medium of claim 21 further comprising instructions for performing the step of, after aggregating the remaining row pieces in each group, combining the row pieces to form result rows, wherein each result row includes a value for each distinct-key column of said plurality of distinct-key columns.

23. The computer-readable medium of claim 21 wherein the step of generating row pieces includes the steps of:
generating codes for each of said distinct-key columns; and
storing, within each row piece generated for a given distinct-key column, the code associated with said given distinct-key column.

24. The computer-readable medium of claim 23 wherein the step of distributing includes applying, for each row piece, a hash key to a hash function to produce a has value, wherein the hash key for each row piece includes the code stored in said row piece, wherein the slave process in said second set of slave processes to which the row piece is sent is determined by said has value.

25. A computer-readable medium carrying one or more sequences of instructions for performing a distinct aggregate operation that involves a plurality of distinct-key columns and grouping, wherein execution of the one or more sequences of instructions by one or more processors causes the one or more processors to perform the steps of:
causing each slave process in a first set of slave processes to perform the steps of:
scanning rows from a data source, wherein each slave in said first set of slaves scans rows from a different portion of said data source;
generating row pieces from the scanned rows, wherein each scanned row issued to generate a row piece for each distinct-key column of said plurality of distinct-key columns;
grouping the row pieces into a first set of groups based on the distinct-key columns with which the row pieces are associated, and the group-by values with which the row pieces are associated;

eliminating duplicate row pieces within each group of said first set of groups; and after eliminating duplicate row pieces, distributing the remaining row pieces to a second set of slave processes, wherein the slave process within said second set of slave processes to which a given row pieces is distributed determined is based on the distinct-key column associated with the given row pieces, and the group-by value associated with the given row piece; and causes each slave process in the second set of slave processes to perform the steps of:

grouping rows pieces received from said first set of slave processes into a second set of groups based on the distinct-key columns associated with the row pieces, and the group-by value associated with the row pieces; and after eliminating duplicate row pieces, aggregating the remaining row pieces in each group according to a set aggregation function associated with the distinct-key column that is associated with the group; and after aggregating the remaining row pieces in each group, distributing the row pieces to a third set of slave processes, wherein the slave process within said third set of slave processes to which a given row piece is distributed is determined based on the group-by value associated with the given row piece; and causing each slave process in the third set of slave processes to combine the row pieces received from the second set of slave processes to produce result rows.

26. The computer-readable medium of claim 25 wherein the slave process within said second set of slave processes to which a given row piece is distributed determined is based on:

the distinct-key column associated with the given row piece, the group-by value associated with the given row piece, and the value in said given row piece for the distinct-key column associated with the given row piece.

27. The computer-readable medium of claim 26 wherein, prior to combining said row pieces, each slave process in said third set of slave processes performs the steps of:

grouping row pieces received from said second set of slave processes into a third set of groups based on the distinct-key columns associated with the row pieces, and the group-by value associated with the row pieces; and aggregating the row pieces in each group according to a set aggregation function associated with the distinct-key column that is associated with the group.

28. The computer-readable medium of claim 25 wherein:

the distinct aggregate operation is specified in a statement;

the statement specifies one or more aggregation operations for one or more non-distinct columns;

the computer-readable medium includes instructions for performing the steps of:

said first set of slave processes generating a set of row pieces for the one or more non-distinct columns;

the first set of slave processes delivering said set of row pieces to said second set of slave processes without performing duplicate elimnation on said set of row pieces.

29. The computer-readable medium of claim 28 further including instructions for performing the step of, prior to delivering said set of row pieces to said second set of slave processes, said first set of slave processes performing partial aggregation of said set of row pieces.

30. The computer-readable medium of claim 29 further comprising instructions for performing the step of said second set of slave processes finishing aggregation of said set of row pieces.

31. The computer-readable medium of claim 28 wherein said first set of slave processes delivers said set of row pieces to said second set of slave processes without performing any aggregation on said set of row pieces.

32. The computer-readable medium of claim 28 further comprising instructions for performing the step of storing within each row piece of said set of row pieces a code that indicates that said row piece is associated with one or more non-distinct columns.

33. The computer-readable medium of claim 25 wherein the step of generating row pieces includes the steps of:

generating codes for each of said distinct key columns; and storing, within each row pieces generated for a given distinct-key column, the code associated with said given distinct-key column.

34. The computer-readable medium of claim 33 wherein the step of distributing includes applying, for each row piece, a hash key to a hash function to produce a hash value, wherein the hash key for each row piece includes the code stored in said row piece, wherein the slave in said second set of slave processes to which the row piece is sent is determined by said hash value.

35. The computer-readable medium of claim 34 wherein, for each row piece, said hash key includes the value, stored in the row piece, for the non-distinct column associated with the row piece.

36. A computer-readable medium carrying one or more sequences of instructions for performing a distinct aggregation operation, wherein execution of the one or more sequences of instructions by one or more processors causes the one or more processor to perform the steps of:

causing a first set of slave processes to perform the steps of scanning data;

performing partial duplicate elimination on said data;

sending said data to a second set of slave processes;

causing said second set of slave processes to perform the steps of finishing duplicate elimination on said data;

performing partial aggregation of said data;

sending data to a third set of slave processes; and causing said third set of slave processes to finish aggregation of said data.

37. The computer-readable medium of claim 36 further comprising instructions for performing the steps of:

causing said first set of slave processes to perform the steps of generating a plurality of row pieces from said data;

distributing each row piece of said plurality of row pieces to said second set of slave processes based on:

a distinct-key column associated with the row piece, a group-by value associated with the row peice; and a vlaue for said distinct-key column that is associated with the row piece.

38. The computer-readable medium of claim 37 wherein:

the step of sending said data to a thrid set of slave processes includes sending a particular set of row pieces to said third set of slave processes;

the second set of slave processes distribute each row piece of said particular set of row pieces to said third set of slave processes based on:
a group-by value associated with the row piece;
the computer-readable medium further includes instructions for performing the step of the third set of slaves combining row pieces to create result rows.

* * * * *

UNITED STATES PATENT AND TRADEMARK OFFICE
CERTIFICATE OF CORRECTION

PATENT NO.     : 6,430,550 B1                                    Page 1 of 1
DATED          : August 6, 2002
INVENTOR(S)    : John Leo et al.

It is certified that error appears in the above-identified patent and that said Letters Patent is hereby corrected as shown below:

Column 23,
Line 43, replace ":" with -- ; --.
Line 50, replace "process" with -- processes --.
Line 62, replace "distant-key" with -- distinct-key --.

Column 24,
Line 27, replace "grouping" with -- group --.
Line 45, replace "has" with -- hash --.
Line 49, replace "has" with -- hash --.
Line 62, replace "issued" with -- is used --.

Column 25,
Lines 9 and 11, replace "pieces" with -- piece --.
Line 13, replace "causes" with -- causing --.
Line 15, replace "rows" with -- row --.
Line 20, please add following -- eliminating duplicate row pieces within each group of the second set of groups; and --.
Line 66, replace "elimnation" with -- elimination --.

Column 26,
Line 24, replace "pieces" with -- piece --.
Line 41, replace "processor" with -- processors --.
Line 50, replace "sending data" with -- sending said data --.
Line 61, replace "peice" with -- piece --.
Line 62, replace "vlaue" with -- value --.
Line 65, replace "thrid" with -- third --.

Signed and Sealed this

Eleventh Day of February, 2003

JAMES E. ROGAN
*Director of the United States Patent and Trademark Office*